United States Patent [19]

Hara et al.

[11] Patent Number: 5,069,943

[45] Date of Patent: Dec. 3, 1991

[54] PROCESS FOR PRODUCING MODIFIED MOLDED POLYMER ARTICLE

[75] Inventors: Shigeyoshi Hara; Umewaka Nakatani, both of Iwakuni, Japan

[73] Assignee: Hercules Incorporated, Wilmington, Del.

[21] Appl. No.: 451,891

[22] Filed: Dec. 18, 1989

[30] Foreign Application Priority Data

Apr. 5, 1989 [JP] Japan .................................... 1-84639

[51] Int. Cl.$^5$ ........................ B29C 45/00; B29C 71/00
[52] U.S. Cl. .................................... 427/400; 264/232; 264/340; 525/332.1; 525/332.3; 525/359.5; 525/359.6; 525/387
[58] Field of Search .................... 264/83, 232, 328.6, 264/331.13, 340; 525/331.9, 332.1, 332.3, 333.1, 355, 359.1, 359.5, 359.6, 387; 528/491, 497, 498, 502; 427/400

[56] References Cited

U.S. PATENT DOCUMENTS

| | | | |
|---|---|---|---|
| 2,631,984 | 3/1953 | Crawford et al. | 525/332.1 X |
| 3,220,993 | 11/1965 | Blatz | 525/332.1 X |
| 3,758,450 | 9/1973 | Margrave et al. | 525/332.3 X |
| 3,968,316 | 7/1976 | Jyo et al. | 428/492 |
| 3,992,221 | 11/1976 | Homsy et al. | 264/83 X |
| 4,228,254 | 10/1980 | Powers et al. | 525/355 X |
| 4,400,340 | 8/1983 | Klosiewicz | 264/328.6 |
| 4,621,107 | 11/1986 | Lagow et al. | 522/131 |
| 4,918,146 | 4/1990 | Matlack | 525/355 X |

*Primary Examiner*—Leo B. Tentoni
*Attorney, Agent, or Firm*—William S. Alexander; Roy V. Jackson

[57] ABSTRACT

Flame retardance of polymers prepared by metathesis polymerization of cycloolefins is improved by treatment of molded articles with a halogenated hydrocarbon capable of entering into radical chain transfer reactions with the carbon-carbon unsaturation present in the polymer recurring unit.

13 Claims, No Drawings

PROCESS FOR PRODUCING MODIFIED MOLDED POLYMER ARTICLE

The present invention relates to a process for the modification of a molded polymer article prepared by the simultaneous polymerization and molding of metathesis polymerizable cycloolefins in the presence of a metathesis polymerization catalyst. More particularly, the invention relates to a process for producing a modified molded polymer article having, among other things, improved flame retardance by contacting said molded polymer article with a halogenated hydrocarbon under appropriate conditions.

It is known that ring-opened polymers are produced from cycloolefins by the use of a metathesis polymerization catalyst system. A process has been proposed to obtain a molded polymer article by carrying out the polymerization and molding of a metathesis polymerizable cycloolefin such as dicyclopentadiene (DCPD), in one step in a mold using a metathesis polymerization catalyst. More particularly, a process has been proposed to obtain a molded polymer article, taking advantage of the fact that a metathesis polymerization catalyst system is composed of two components consisting of a catalyst component such as, e.g., tungsten chloride and an activator component such as an alkylaluminum, by using two solutions each containing one of the catalyst system components and a monomer, quickly mixing the solutions and injecting the mixture into a mold (for example, cf. Japanese Patent Laid Open Sho 58-129013).

This process (hereinafter referred to as "reaction molding") is very attractive from the industrial viewpoint because large-sized molded articles having excellent properties can be produced with inexpensive low-pressure molds. However, it has been found that various improvements on the process are desirable for some applications.

Impartment of flame retardance to the polymer is one problem to be solved. Since the polymer is principally composed of hydrocarbon repeating units containing unsaturated bonds, it is highly combustible once ignited. Therefore, a polymer having improved flame retardance is frequently required according to the intended use.

Improved flame retardance can be imparted to the polymer by introduction of halogen either into the polymer molecule or as an additive to the polymer composition. Examples of processes for achieving this purpose include using a halogen atom-containing metathesis polymerizable cycloolefin as at least a part of the monomer components, treatment with neat molecular liquid or gaseous halogen, and the addition of a conventional halogen-containing low-molecular weight compound containing a large amount of halogen such as decabromodiphenyl ether or a halogen-containing polymer containing a large amount of halogen such as a poly(bromostyrene). The first process is, in principle, a highly desirable technique for obtaining a flame-retardant polymer. However, the method is commercially impractical since such a halogen-containing monomer is not available as a raw material in commercial production. The use of a low-molecular weight or polymeric halogen-containing flame retardant is easy to practice because a commercially available flame retardant meets the purpose. However, such flame retardants are usually sparingly soluble in the cycloolefins used as the monomer and, consequently, the reactive solution becomes non-uniform on standing due to precipitation of the flame retardant. Such precipitation creates handling difficulties during molding and is also detrimental to physical properties of the molded polymer.

In a companion U.S. patent application Ser. No. 07/451,703, filed on Dec. 18,1989, the same date as this application, and commonly assigned, use has been made of the fact that metathesis polymers contain at least one carbon-carbon double bond in each recurring unit and that the double bond easily undergoes an addition reaction with a halogen molecule. The polymer is shown to be made flame retardant by such treatment. However, the halogen molecule used in the halogenation treatment is toxic and is difficult to handle and the molded article should be swollen with an organic solvent to perform the halogenation to attain sufficient flame retardance. It has been found that for some applications, virtually all of the solvent must be removed from the molded article after the halogenation and considerable difficulty and expense are encountered in the removal procedure for these applications. However, when certain halogenated hydrocarbons are used as the solvent, a considerable amount of the compounds cannot be removed from the molded polymer article by any means and the residual compound left in the article contributes to the improvement in the flame retardance. In accordance with this invention, it has been found that certain halogenated solvents can be made to react with the unsaturated bond of the metathesis polymer by a radical chain transfer reaction. The present invention is a method for producing a modified molded polymer article which comprises contacting a molded polymer article produced by the reaction molding of at least one metathesis polymerizable cycloolefin in the presence of a metathesis polymerization catalyst with a halogenated hydrocarbon capable of acting as a strong radical chain transfer agent under conditions that enable the halogenated hydrocarbon to react with unsaturated carbon-carbon bonds in the metathesis polymer by the radical chain transfer reaction.

The halogenated hydrocarbon capable of acting as a strong radical chain transfer in the present invention is a compound having generally plural halogen atoms bonded to a carbon atom and taking the SP3 orbit wherein at least one of the halogen atoms does not take the form liable to be eliminated as a hydrogen halide together with the hydrogen atom substituting a carbon atom adjacent to the carbon atom bonded with said halogen atom. In the above type of compound, the action as a chain transfer agent is further increased when the carbon atom adjacent to the carbon atom bonded with the halogen atom forms a part of an aromatic group, a carbonyl group or another unsaturated bond and when the carbon radical left after the chain transfer of one of its halogen atoms has an easily stabilizable form.

The halogen atom is preferably chlorine or bromine, among which bromine is more preferable because of high chain transfer action compared with a corresponding chlorine atom.

The halogenated hydrocarbon is brought into contact with the molded polymer article preferably in liquid state and, accordingly, the halogenated hydrocarbon preferably is liquid at normal temperature. However, the halogenated hydrocarbon is not necessarily restricted to liquid substances because even a solid substance may be used if it can be dissolved in an inert solvent or if it can be liquified at a reasonably low temperature.

Examples of the halogenated hydrocarbon which can be used include trichlorobromomethane, carbon tetrachloride, carbon tetrabromide, 1,1,2,2-tetrachloro-1,2-dibromoethane, hexachlorocyclopentadiene, brominated benzyl chloride, dichloro-di(brominated phenyl)methane, hexachloro-p- or -m-xylene, chloroform and trichloroacetic acetic acid. Trichlorobromomethane is especially preferred.

A molded polymer article produced by using at least one metathesis polymerizable cycloolefin as at least a part of the monomer component and carrying out the reaction molding of the monomer in the presence of a metathesis polymerization catalyst can be used as the molded polymer article (I) used for the treatment in the present invention, because the polymer contains at least one carbon-carbon double bond in its recurring unit and halogen can be added to the double bond by the modification treatment of the present invention.

Especially preferable article is a crosslinked molded polymer article produced by using a main monomer component consisting of metathesis polymerizable cycloolefins containing a cycloolefin having two or more metathesis polymerizable cycloolefin groups as at least a part of the main monomer component. Polymerization is effected by preparing two reactive solutions A and B, one containing a catalyst component and one containing an activator component together with the monomers, quickly mixing the solutions, for example by impingement mixing, and pouring the mixture into a mold to effect the reaction.

The metathesis polymerizable cycloolefin is preferably one having a high degree of ring strain because of its high polymerizability. Especially, a group having norbornene structure is preferable from the viewpoint of the ease of production and high polymerizability.

Preferable concrete examples of metathesis polymerizable cycloolefins include dicyclopentadiene, tricyclopentadiene, 1,4,5,8-dimethano-1,4,4a,5,8,8a-hexahydro-naphthalene, 1,4,5,8,9,10-trimethano-1,4,4a,5,8-,8a,9,9a,10,10a-decahydroanthracene, 1,2-addition compound of 1,5-cyclooctadiene, and cyclopentadiene, ethylenebisnorbornene, phenylenebisnorbornene, norbornene, norbornadiene, 5-methylnorbornene, 5-ethylidenenorbornene, 5-phenylnorbornene, vinylnorbornene, dihydrodicyclopentadiene, cyclopentadiene-methylcyclopentadienecodimer, 1,4,5,8-dimethano-1,4,4a,5,6,7,8,8a-octahydronaphthalene, 6-methyl-1,4,5,8-dimethano-1,4,4a,5,6,7,8,8aoctahydronaphthalene, and 6-ethylidene-1,4,5,8-dimethano1,4,4a,5,7,8,8a-heptahydronaphthalene.

In the present invention, other cycloolefins containing hetero atom, in other words cycloolefins having a polar group may be used as a part of the monomer in addition to the cycloolefins composed solely of hydrocarbons. The polar group is preferably an ester group, ether group, cyano group, N-substituted imido group or halogen.

Examples of the copolymerizing monomer include 5-methoxycarbonylnorbornene, 5-(2-ethylhexyloxy)-carbonyl-5-methylnorbornene, 5-phenyloxymethylnorbornene, 5-cyanonorbornene, 6-cyano-1,4,5,8-dimethano-1,4,4a,5,6,7,8,8a-octahydronaphthalene, N-butylnadic acid imide, 5,6-dichloronorbornene and the like.

It is required that the metathesis polymerizable polycyclic cycloolefins be those containing the lowest possible amount of impurities which inactivate the metathesis polymerization catalyst.

The preferable monomer composition for the molded polymer article of the present invention is a combination of 100 to 50 mol % of dicyclopentadiene, the remaining part being at least one other metathesis polymerizable cycloolefin having the norbornene structure unit mentioned above.

As the catalyst component of the metathesis polymerization catalyst system used in the production of the molded polymer article of the present invention are used salts such as halides of tungsten, rhenium, tantalum, molybdenum and the like, especially tungsten and molybdenum compounds. Among preferred compounds are tungsten and molybdenum halides and oxyhalides. More particularly, tungsten hexachloride and tungsten oxychloride are preferred. Organo ammonium tungstate or molybdate may also be used. However, some of these tungsten or molybdenum salt compounds undesirably initiate cationic polymerization immediately when added directly to the monomer. A Lewis base or a chelating agent can be added to the catalyst in an amount of about 1 to 5 mol per 1 mol of the tungsten compound in order to prevent undesirable polymerization. Those additives may include acetylacetone, acetoacetic acid alkyl esters, tetrahydrofuran, benzonitrile and the like. Under such situations, the monomer solution (Solution A) containing the catalyst component has sufficiently high stability for practical use. It is also sometimes desirable that the tungsten salt compounds be previously suspended in an inert solvent such as benzene, toluene or chlorobenzene and solubilized by the addition of a small amount of an alcoholic compound or a phenolic compound.

The activator components of the metathesis polymerization catalyst system include organometallic compounds chiefly comprising alkylated compounds of metals of group I - group III in the periodic table, preferably, tetraalkyltins, trialkyltin hydrides, alkylaluminum compounds and alkyl-aluminum halide compounds such as diethylaluminum chloride, ethylaluminum dichloride, trioctylaluminum, dioctylaluminum iodide, tetrabutyltin and tributyltin hydrides. The organometallic compound used as the activator component is dissolved in the monomer mixture to form the other reactive solution (Solution B) containing the activator.

According to the present invention the molded polymer articles are produced by mixing the Solution A with the Solution B. The polymerization reaction, however, starts very rapidly when the above-mentioned composition is used and, consequently, undesirable initiation of hardening can occur before the mold is completely filled with the mixed solution. In order to overcome the problem, it is preferable to use a polymerization moderating agent. As such moderators are generally used Lewis bases, particularly, ethers, esters, nitriles and the like. Examples of the moderators include ethyl benzoate, butyl ether, diglyme and the like. Such moderators are generally added to the solution containing the activator component comprising the organometallic compound. When a monomer having a polar group and acting as a Lewis base is used in the reactive solution, the monomer may be used to play the role of the moderator.

When a tungsten compound is used as the catalyst component, the ratio of the tungsten compound in the metathesis polymerization catalyst system to the above-mentioned monomers is about 1000:1 to about 15000:1, and preferably about 2000:1 on the molar basis. When an alkylaluminum compound is used as the activator component the ratio of the aluminum compound to the above-mentioned monomers is about 100:1 to about 2000 and preferably around a ratio of about 200:1 to about 500:1 on the molar basis. The amount of the moderator may be adjusted by experiments depending upon the amount of the catalyst system.

In order to decrease the residual monomer content, a small amount of an active halogen compound such as trichloromethyl toluene, ethyl trichloroacetate, isophthaloyl chloride and the like or an acid anhydride such as benzoic anhydride may be added in the production of the molded polymer article of the present invention.

A variety of additives may be used in the molded polymer article of the present invention to improve or to maintain characteristics of the molded articles. The additives include fillers, pigments, antioxidants, light stabilizers, flame retardants, macromolecular modifiers and the like. These additives have to be added to the starting solutions, since they cannot be added after the solutions are polymerized to the molded polymer article Such additives may be added easily to either one or both of the Solution A and the Solution B. The additives should be ones being substantially unreactive with the highly reactive catalyst component, activator component and acid anhydrides in the solutions to avoid practical troubles and they have no inhibitory action to polymerization. If a reaction between the additive and the catalyst component or the activator component is unavoidable, but does not essentially inhibit the polymerization, the additives can be mixed with the monomers to prepare a third solution, and the third solution is mixed with the first and/or second solutions immediately before polymerization. When the additive is a solid filler forming gaps which can be filled sufficiently with both solutions immediately before or during the polymerization reaction, the mold may be filled with the filler prior to charging the reactive solutions into the mold.

The reinforcing materials or fillers used as additives can improve flexural modulus of the polymer. These include glass fibers, mica, carbon black, wollastonite and the like.

The molded polymer article used in the present invention preferably contain an antioxidant. Preferably, a phenolic- or amine-antioxidant is added to the solution in advance. Examples of the antioxidants include: 2,6-t-butyl-p-cresol, N,N-diphenyl-p-phenylenediamine, and tetrakis[methylene(3,5-di-t-butyl-4-hydroxycinnamate)]-methane.

The molded polymer articles of the present invention may also contain other polymers, which are added to the monomer solution. Among polymers, elastomers are most used, since the addition of elastomer is effective in improving the impact strength of the molded articles and controlling the viscosity of the solution. Examples of the elastomers to be used for the above purpose include, e.g., a wide variety of elastomers such as styrene-butadiene-styrene triblock rubber, styrene-isoprene-styrene triblock rubber, polybutadiene, polyisoprene, butyl rubber, ethylene-propylene-diene terpolymer and nitrile rubber.

As described above, the molded polymer articles to be used in the present invention are prepared by reaction molding.

The molding methods of the article include, as mentioned above, a resin injection (also known as "resin transfer") process comprising the mixing of a catalyst and a monomer with a static mixer or the like in advance and the injection of the produced premix into a mold and a RIM process comprising the impingement mixing of the Solution A and the Solution B containing divided catalyst system in a mix head and the substantially immediate injection of the mixture into the mold. The RIM process is generally used.

In both of RIM process and resin injection process, the mixture can be introduced into the mold under relatively low pressure, so that an inexpensive mold is usable. The temperature in the mold increases rapidly by the heat of reaction upon the start of the polymerization reaction in the mold, so that the polymerization reaction is completed in a short time. The molded article of the invention can be removed easily from the mold without using a mold release agent.

The molded polymer article produced by the above method is brought into contact with the halogenated hydrocarbon under conditions that enable the halogenated hydrocarbon to react with the unsaturated bond in the metathesis polymer by the radical chain transfer reaction.

The radical chain transfer can be brought about by using a radical initiator in combination with the above halogenated hydrocarbon, contacting the above molded article with both materials and decomposing the radical initiator with heat or irradiation of light to initiate the chain transfer reaction. Any conventional radical initiator can be used as the radical initiator for the present process. For example, the radical initiator can be a peroxide such as tertiary butyl hydroperoxide, a peracid derivative such as benzoyl peroxide or a combination of the above with a tertiary amine or a metal ion having low atomic valence such as ferrous ion to form a redox system. A radical initiator which can form a radical by its action, e.g., benzoin, can also be used in the present process. The amount of the radical initiator is generally about 0.5 to 20 mol %, especially about 1 to 10 mol % based on the above halogenated hydrocarbon.

Unexpectedly, it has been found that the radical chain transfer can also be easily induced in the present invention without using the above radical initiator. As mentioned before, the polymer of the present invention contains at least one carbon-carbon double bond in each recurring unit. For this reason, the surface is easily oxidized in air. One mechanism for such oxidation is the formation of a peroxide from oxygen in the air and an unsaturated carbon-carbon bond followed by the decomposition of the peroxide to induce a radical reaction. Accordingly, when a halogenated hydrocarbon having strong radical chain transfer action is present in the system, the hydrocarbon is subjected to radical chain transfer to cause the introduction of the halogenated hydrocarbon residue into the metathesis polymer chain at the double bond.

Furthermore, such metathesis molded polymer article contains a transition metal ion as a catalyst residue. This ion is partially reduced to a state of lower atomic valence by the reaction with the organometallic catalyst activator compound. This metallic residue can initiate a redox reaction with the halogenated hydrocarbon and initiate the radical chain transfer reaction. The above autocatalytic radical chain reaction is accelerated by the presence of light.

It is believed that, by one or more of the abovementioned mechanisms, the halogenated hydrocarbon can be fixed in the molded polymer article and the article, accordingly, is imparted improved flame retardance. The reaction is effected by absorbing the halogenated hydrocarbon into the molded polymer article and heating in air at about 50° to 90° C. for about 0.5 to 100 hours.

The extent of the flame retardance imparted to the molded article can be controlled by adjusting the time and temperature of contact with the halogenated hydrocarbon, thereby controlling the amount of halogenated hydrocarbon absorbed into the molded polymer article. Most preferably, the temperature is between room temperature and 80° C. and the period is about 0.1 to 10 hours. As stated above, the radical initiator can be most easily used by dissolving it in the halogenated hydrocarbon and absorbing it together with the halogenated hydrocarbon into the molded polymer article.

The halogenated hydrocarbon absorbed in the molded polymer article by the above contacting process becomes bonded to the article by the heat treatment. In some cases, the heat treatment has to be carried out in air or under light irradiation. In the case of using a radical initiator, it is generally preferable to use an initiator that decomposes with heat depending upon the decomposition temperature of said radical initiator. The bonding can be carried out, as mentioned above, by heating generally at 50° to 90° C. for 0.5 to 100 hours irrespective of the presence or absence of the radical initiator.

During the heat treatment portion of the process, some of the unreacted halogenated hydrocarbon is evaporated. The progress of the reaction can be followed by monitoring the weight loss occasioned by this evaporation during the heating period. The treatment is considered to be completed and the heating is discontinued when the weight loss stops and the weight becomes constant. If the reaction is terminated before the weight becomes constant, the article may be extracted with another solvent to remove the residual unreacted halogenated hydrocarbon. However, the removal of the solvent is a troublesome and expensive problem. Accordingly, it is preferable to complete the reaction by quickly making the weight constant by a proper control of the reaction variables such as, e.g., the amount of halogenated hydrocarbon employed and the treatment temperature.

The amount of bonded halogenated hydrocarbon can be estimated by the weight increase of the article after it reaches constant weight over that of the original article. The degree of flame retardance can be controlled by the extent of the weight increase.

In addition to improved flame retardance, the chemical stability or the resistance to electrophilic chemical attack at the double bond of the polymer is found to be improved by the bonding of the halogenated hydrocarbon to the double bond.

The modified product produced by the present invention can be subjected to various post-treatment processes such as coating, adhesion and the like similar to the conventional molded metathesis polymer article. Molded articles treated by the defined process are used in a variety of applications where flame retardance is desirable. Such applications include, e.g., components of various transportation vehicles on ground, water or snow including automobiles, motorbikes, golf carts, snowmobiles, boats, hydroscooters, sand buggies and tractors.

The invention described herein is illustrated in detail by the following Examples. These examples are solely for explanation and do not limit the scope of the invention.

EXAMPLES 1 AND 2

Tungsten hexachloride (20 parts by weight) was added to 70 parts by volume of anhydrous toluene under nitrogen. The obtained mixture was mixed with a solution consisting of 21 parts by weight of nonylphenol and 16 parts by volume of toluene to obtain a catalyst solution containing 0.5 M of tungsten. The solution was purged with nitrogen over night to remove the hydrogen chloride gas formed by the reaction of tungsten hexachloride and nonylphenol. A catalyst solution for polymerization was prepared by adding 1 part by volume of acetylacetone to 10 parts by volume of the solution produced by the above procedure.

To a monomer mixture consisting of 95 parts by weight of purified dicyclopentadiene and 5 parts by weight of purified ethylidenenorbornene was added 3 parts by weight of an ethylene-propylene-ethylidenenorbornene copolymer rubber having an ethylene content of 70 mol % and with 2 parts by weight of Ethanox 702 as an oxidation stabilizer. The obtained solution was mixed with the above catalyst solution for polymerization in an amount to give a tungsten content of 0.001 M and obtain a catalyst component solution (Solution A).

A mixed solution of polymerization activator was prepared by mixing trioctylaluminum, dioctylaluminum iodide and diglyme at molar ratios of 85:15:100. The mixed solution was added to a mixture consisting of 95 parts by weight of purified dicyclopentadiene, 5 parts by weight of purified ethylidenenorbornene and 3 parts by weight of the above-mentioned ethylene-propylene-ethylidenenorbornene copolymer rubber in an amount to give an aluminum content of 0.003 M to obtain an activator component solution (Solution B).

A molded plate of a metathesis polymer having a thickness of 3 mm was produced from the Solution A and the Solution B prepared above using a reaction injection molding machine. The liquid temperature and the mold temperature in the injection were 30° C. and 80° C., respectively.

The molded plate prepared above was cut to form sample plates having a dimension of 12.5 cm×1.25 cm×3 mm. The sample plates were immersed in trichlorobromomethane at room temperature for 3 hours and 5 hours. The weight of the treated plates was increased by 23 and 43%, respectively. The weights were gradually decreased by the treatment in air at 75° C. and reached constant after 48 hours. The ratios of the weight increase were measured to be 19 and 36%, respectively.

The rectangular piece of the treated sample was clamped at one end and held in a horizontal state. The other end of the sample was ignited with a gas burner for 30 seconds and the time required to burn 10 cm of the sample after the start of ignition or, if the sample was extinguished prior to complete burning, the time from the ignition to the extinguishment and the length burnt before extinguishment were measured. A similar combustion test was carried out on an untreated molded plate for comparison and the period to burn 10 cm of the plate was also measured. The untreated sample was burnt out within 2.7 minutes while the burnt lengths and times to extinguishment of the samples treated for 3 hours and 5 hours were, respectively, 8 cm and 1.4 minutes and 7.5 cm and 1.7 minutes, respectively. The improvement of flame retardance is apparent from the above results.

EXAMPLES 3 AND 4

Molded plates as prepared in Example 1 were immersed for 3 hours in solvents produced by mixing trichlorobromomethane with 5 wt. % of benzoyl peroxide or with 5 wt. % of t-butyl hydroperoxide instead of pure trichlorobromomethane.

The treated samples were heated at 75° C. under reduced pressure. The weight of the sample became constant after 8 hours and the ratios of weight increase were 15 and 18%, respectively. The samples were subjected to the combustion test described for the above examples and the flames were extinguished after 1.2 minutes at a length of 7 cm and after 0.9 minute at a length of 8 cm, respectively The improvement of the flame retardance is apparent from the above results.

We claim:

1. A method of improving the flame retardance of a molded crosslinked metathesis polymer article wherein said polymer comprises recurring units containing unsaturated carbon-carbon bonds which method comprises contacting said molded polymer article with a halogenated hydrocarbon capable of acting as a strong radical chain transfer agent under conditions that enable said halogenated hydrocarbon to react with unsaturated carbon-carbon bonds in said methathesis polymer recurring units.

2. A method for improving the flame retardance of a molded crosslinked metathesis polymer made up of at least 50 mol% of recurring units derived from dicyclopentadiene, which method comprises contacting said molded polymer article with a halogenated hydrocarbon capable of acting as a strong radical chain transfer agent at a temperature of about 50° to 90° C. about 0.5 to 100 hours.

3. The method of claim 2 wherein the surface of said molded polymer article is contacted with the halogenated hydrocarbon in the presence of a radical initiator.

4. The method of claim 3 wherein the halogenated hydrocarbon is selected from the group consisting of trichlorobromomomethane, carbon tetrachloride, carbon tetrabromide, 1,1,2,2-tetrachloro-1,2-dibromoethane, hexachlorocyclopentadiene, brominated benzyl chloride, dichloro-di(brominated phenyl)methane, hexachloroxylenes and chloroform.

5. The method of claim 4 wherein the halogenated hydrocarbons is trichlorobromomethane.

6. The method of claim 1 wherein the metathesis polymer is made up of at least 50 mol % of recurring units derived from dicyclopentadiene.

7. The method of claim 6 wherein the surface of said molded polymer article is contacted with the halogenated hydrocarbon at a temperature of about 50° to 90° C. for about 0.5 to 100 hours.

8. The method of claim 6 wherein the surface of said molded polymer article is contacted with the halogenated hydrocarbon in the presence of a radical initiators.

9. The method of claim 7 the surface of said molded polymer article is contacted with the halogenated hydrocarbon in the presence of a radical initiator.

10. The method of claim 6 wherein the halogenated hydrocarbon is selected from the group consisting of trichlorobromomethane, carbon tetrachloride, carbon tetrabromide, 1,1,2,2-tetrachloro-1,2-dibromoethane, hexachlorocyclopentadiene, brominated benzyl chloride, dichloro-di(brominated phenyl)methane, hexachloroxylenes and chloroform.

11. The method of claim 7 wherein the halogenated hydrocarbon is selected from the group consisting of trichlorobromomethane, carbon tetrachloride, carbon tetrabromide, 1,1,2,2-tetrachloro-1,2-dibromoethane, hexachlorocyclopentadiene, brominated benzyl chloride, dichloro-di(brominated phenyl)methane, hexachloroxylenes and chloroform.

12. The method of claim 10 wherein the halogenated hydrocarbon is trichlorobromomethane 13. The method of claim 11 wherein the halogenated hydrocarbon is trichlorobromomethane.

* * * * *

UNITED STATES PATENT AND TRADEMARK OFFICE
CERTIFICATE OF CORRECTION

PATENT NO. : 5,069,943

DATED : December 3, 1991

INVENTOR(S) : Shigeyoshi Hara and Umewaka Nakatani

It is certified that error appears in the above-identified patent and that said Letters Patent is hereby corrected as shown below:

column 3, line 42, "drona-phthalene" should read "dronaphthalene";

column 5, line 3, "component the" should read "component: the";

column 5, line 5, "2000" should read "2000:1"."

column 5, lines 22 and 23, "article Such" should read --article. Such--;

In the claims, column 10, lines 19 and 20, "initiators" should read --initiator--;

Signed and Sealed this

Twenty-sixth Day of October, 1993

Attest:

BRUCE LEHMAN

Attesting Officer

Commissioner of Patents and Trademarks